US008019894B2

(12) United States Patent  
Lin et al.

(10) Patent No.: US 8,019,894 B2
(45) Date of Patent: Sep. 13, 2011

(54) SYSTEM, METHOD AND ENGINE FOR PLAYING SMIL BASED MULTIMEDIA CONTENTS

(75) Inventors: Jian Lin, Beijing (CN); Rong Sheng Zhang, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 11/912,409

(22) PCT Filed: Apr. 25, 2006

(86) PCT No.: PCT/EP2006/061808
§ 371 (c)(1),
(2), (4) Date: Jun. 10, 2008

(87) PCT Pub. No.: WO2006/114413
PCT Pub. Date: Nov. 2, 2006

(65) Prior Publication Data
US 2008/0250130 A1 Oct. 9, 2008

(30) Foreign Application Priority Data
Apr. 27, 2005 (CN) .......................... 2005 1 0068218

(51) Int. Cl.
G06F 15/16 (2006.01)

(52) U.S. Cl. ....................................... 709/246; 709/225

(58) Field of Classification Search .................. 709/225, 709/231–235, 246
See application file for complete search history.

(56) References Cited

U.S. PATENT DOCUMENTS

| 6,172,673 | B1 | 1/2001 | Lehtinen et al. |
| 6,333,919 | B2 | 12/2001 | Gaffney |
| 6,466,232 | B1 | 10/2002 | Newell et al. |
| 6,564,263 | B1 * | 5/2003 | Bergman et al. .............. 709/231 |
| 6,654,814 | B1 | 11/2003 | Britton et al. |

(Continued)

OTHER PUBLICATIONS

Kidawara, Y, et al., "Operating Mechanism for Device Cooperative Content on Ubiquitous Networks", Creating, Connecting and Collaborating Through Computing, Proceedings, Second International Conference, IEEE, pp. 54-51 (Jan. 2004).

(Continued)

Primary Examiner — William C Vaughn, Jr.
Assistant Examiner — Mohamed Ibrahim
(74) Attorney, Agent, or Firm — Patents on Demand, P.A.; Brian K. Buchheit; Scott M. Garrett

(57) ABSTRACT

A system for playing SMIL based multimedia contents, comprising: a plurality of SMIL engines for analyzing and interpreting SMIL documents, as well as communicating with and controlling SMIL sub engines, remote media proxies, or local media playing devices; a plurality of remote media proxies for receiving instructions from the upper level SMIL engines, starting or stopping providing media objects to the remote media playing devices, sending back events, and providing basic user interaction capabilities, wherein said a plurality of SMIL engines, a plurality of remote media proxies, and local and remote media playing devices construct a tree-link structure, of which the root node is a SMIL engine, the branch nodes are SMIL engines and remote media proxies, and the leaf nodes are local and remote media playing devices. The corresponding SMIL engines and methods are also provided. The present invention enables the playing of SMIL based multimedia contents on a set of PvC devices, which can be dynamically configured as a new multimedia terminal on demand.

17 Claims, 3 Drawing Sheets

U.S. PATENT DOCUMENTS

| | | |
|---|---|---|
| 6,859,879 B2 | 2/2005 | Henn et al. |
| 7,185,090 B2 | 2/2007 | Kowalski et al. |
| 7,219,163 B2 | 5/2007 | Robinson et al. |
| 7,484,218 B2 * | 1/2009 | Marcos et al. ............... 719/315 |
| 7,653,735 B2 * | 1/2010 | Mandato et al. ............. 709/231 |
| 2001/0040900 A1 * | 11/2001 | Salmi et al. .................. 370/487 |
| 2002/0038459 A1 | 3/2002 | Talmola et al. |
| 2002/0059344 A1 | 5/2002 | Britton et al. |
| 2003/0110297 A1 * | 6/2003 | Tabatabai et al. ............ 709/246 |
| 2003/0135860 A1 | 7/2003 | Dureau |
| 2004/0031058 A1 | 2/2004 | Reisman |
| 2004/0068510 A1 * | 4/2004 | Hayes et al. ................. 707/100 |
| 2004/0096186 A1 * | 5/2004 | Tsumagari et al. ............ 386/46 |
| 2004/0111676 A1 * | 6/2004 | Jang et al. .................... 715/513 |
| 2004/0128342 A1 | 7/2004 | Maes et al. |
| 2004/0133678 A1 | 7/2004 | Tamura |
| 2004/0230699 A1 | 11/2004 | Gargi |
| 2005/0038826 A1 * | 2/2005 | Bae et al. ...................... 707/200 |
| 2006/0031749 A1 * | 2/2006 | Schramm et al. .......... 715/500.1 |

OTHER PUBLICATIONS

Open Mobile Alliance: "Multimodal and Multi-device Services Requirements", pp. 1-40, http://www.openmobilealliance.org/release_program/docs/RD/OMA-RD-Multimodal_Multi-device_Services-V1_1-200311113-C.pdf (Nov. 2003).

Yutaka Kidawara et al, "Operating Mechanism for Device Cooperative Content on Ubiquitous Networks", Proceedings of Second International Conference on Creating, Connecting and Collaborating through Computing, Computer Society, 2004, IEEE.

* cited by examiner

SYSTEM, METHOD AND ENGINE FOR PLAYING SMIL BASED MULTIMEDIA CONTENTS

CROSS-REFERENCE TO RELATED APPLICATIONS

This is the U.S. National Stage of PCT/EP2006/061808 filed 25 Apr. 2006, which claims priority from Chinese Patent Application No. 200510068218.1 filed 27 Apr. 2005, each of which is hereby incorporated by reference.

TECHNICAL FIELD

The present invention relates to techniques for playing Synchronized Multimedia Integration Language (SMIL) based multimedia contents in the field of computer networks, specifically, to the engine, system and method for playing said multimedia contents on pervasive computing (PvC) devices.

TECHNICAL BACKGROUND

SMIL is a multimedia control language defined by World Wide Web Consortium (W3C) for encoding time based multimedia presentation delivered over the Web, defining when, where and how to play segments of multimedia (such as animation, audio, video, still image, static text and text stream). With such a language, a set of independent multimedia objects can be integrated into synchronized multimedia contents, and user interaction can be supported during playing, SMIL may be applied in Web TV, on-line course, multimedia presentation, etc. SMIL has been widely used in client side applications by Realnetwork, Apple, Microsoft, etc.

Conventional SMIL browsers, such as Xsmiles, Apple QuickTime and Helix, can support full profile and extension of SMIL 2.0. These browsers, similar to Web browsers, are pure client software designed for PC-like multimedia devices.

With the advent of more and more networked PvC devices, such as Personal Digital Assistant (PDA), mobile phone, in-home and telematix device, the requirement is arisen to play SMIL based multimedia contents on such devices. However, a PvC device usually can only play media objects in one kind of media format due to the limitation of media objects playable on such device, so it is difficult for one PvC device to support the playing of a plurality of media objects. For instance, a POTS telephone only supports audio; an IP telephone and a mobile phone may support audio and simple text input; a PDA may support text and still image, and even simple video stream, based on network browsing and user interaction; and a TV set and digital HiFi system support the playing of real-time video and audio stream. However, the resources of the PvC devices for the playing media objects as described above are limited so that only a subset of standard multimedia types defined by SMIL can be played. Besides, the limitation of resources makes it difficult to implement such functions as multi-threading and complicated timing/synchronization mechanism and integration of a plurality of media on PvC devices.

There are prior methods for supporting SMIL on handheld devices. For instance, a 3GPP SMIL profile used for Multimedia Messaging Service (MMS) may support the playing of SMIL based multimedia contents on a mobile phone with SMIL interpretation capability. A 3GPP SMIL profile, however, is only a subset of SMIL 2.0 basic profile and the media contents that may be played on a handheld device are limited. For instance, US Patent Application 2003/0229847 entitled as "Multimedia Reproducing Apparatus and Method" discloses a method for reproducing SMIL based multimedia contents on a single mobile device. But, the application focuses on serialization of the parallel timing and synchronization mechanism, and does not solve the vital problem of resources for playing complicated multimedia contents and flexible user interaction. Thus, both above-mentioned approaches can only support the playing of SMIL based multimedia contents on PvC devices with SMIL interpretation capability. As a result, it is impossible to play SMIL based multimedia contents on PvC devices without SMIL interpretation capability.

SUMMARY OF THE INVENTION

The present invention is proposed just based on the above technical problems. Its purpose is to provide a SMIL engine, system and method for playing SMIL based multimedia contents on pervasive computing devices. With the SMIL engine, system and method of the present invention, a set of PvC devices may be dynamically configured to work in collaboration with each other for jointly playing SMIL based multimedia contents, so as to reduce the requirement on the media interaction capabilities of PvC devices. Thus, the full profile and extension of SMIL 2.0 may be supported.

According to an aspect of the present invention, there is provided a SMIL engine for playing SMIL based multimedia contents, comprising:

a media device registry for registering media devices controlled by said SMIL engine;

a SMIL parser for, based on the analysis of a SMIL document and the acquired information on the media interaction capabilities of the media devices, generating intermediate SMIL models and distributing the intermediate SMIL models to next level SMIL engines and/or remote media proxies and generating corresponding local proxy objects, and generating internal SMIL models to be deployed on a local SMIL interpreter;

a SMIL interpreter for interpreting and executing the playing logic of the SMIL document, triggering next level SMIL engines and/or remote media proxies and/or local media playing devices to play the media contents, and controlling interaction with a user; and a remote event proxy for maintaining a mapping table that contains the relationships between said local proxy objects and the intermediate SMIL models distributed to the next level SMIL engines and/or remote media proxies, and being responsible for event transferring between the local SMIL engines and the next level SMIL engines and/or remote media proxies.

Preferably, the media devices controlled by said SMIL engine comprise: next level SMIL engines, remote media proxies and local media playing devices, all of which support a subset of SMIL defined media interaction capabilities and register respective media interaction capabilities and location information in said media device registry when system starts up.

Preferably, said intermediate SMIL model comprises: a time container that contains multimedia contents distributed to a next level SIM, engine and a media object distributed to a remote media proxy; said internal SMIL model is a time container executable on a local SMIL interpreter, comprising the control logic of the present level SMIL model and the media object distributed to a local media playing device.

Preferably, said events comprise: timing events, document object model events, user interaction events, and internal events.

Preferably, said local media playing device comprises:

a media playing controller for driving a media player based on the triggering mechanism of said SMIL interpreter, and acquiring the media contents to be played; and a media player for playing media contents.

According to another aspect of the present invention, there is provided a system for playing SMIL based multimedia contents, comprising:

a plurality of SMIL engines as described above, for analyzing, interpreting, and executing SMIL documents, as well as communicating with and controlling the next level SMIL engines, remote media proxies, or local media playing devices;

a plurality of remote media proxies for receiving instructions from the upper level SMIL engines, starting or stopping providing media objects to the remote media playing devices, sending back events, and providing basic user interaction capabilities;

said a plurality of SMIL engines, a plurality of remote media proxies, and local and remote media playing devices construct a tree-link structure, of which the root node is a SMIL engine, the branch nodes are SMIL engines and remote media proxies, and the leaf nodes are local and remote media playing devices.

According to still another aspect of the present invention, there is provided a method for playing SMIL based multimedia contents in said system, comprising following steps:

analyzing, with a SMIL engine, a SMIL document and acquiring information on the media interaction capabilities of the media devices controlled by said SMIL engine;

based on the acquired information on the media interaction capabilities, with said SNAIL engine, generating intermediate SMIL models, distributing the intermediate SMIL models to next level SMIL engines and/or remote media proxies, and generating corresponding local proxy objects; and/or generating internal SMIL models to be deployed on a local SMIL interpreter;

updating a mapping table, which records the relationships between said local proxy objects and the intermediate SMIL models distributed to the next level SMIL engines and the remote media proxies;

executing the above-mentioned steps recursively till the last level SMIL engines with the next level SMIL engines;

interpreting respectively the received intermediate SMIL models and generating internal SMIL models with each said SMIL engine; and starting up the remote media playing devices and/or local media playing devices to play media contents according to time and events.

The present invention has following advantages: 1) the invention may dynamically configure PvC devices on demand to construct a new multimedia terminal for playing multimedia contents; 2) the invention may meet the requirements for playing synchronous media contents on a set of PvC devices with limited resources; 3) compared with conventional SMIL client application mode, the invention applies a distributed mode for better utilization of the performance of servers and intermediate nodes; 4) with the invention, PvC devices without SMIL interpretation capability may be integrated into SMIL based applications.

DETAILED DESCRIPTION OF THE INVENTION

It is believed that above-mentioned and other objectives, features and advantages of the present invention will be more clearly understood through the following detailed descriptions of embodiments of the present invention with reference to the drawings.

Figure 1:
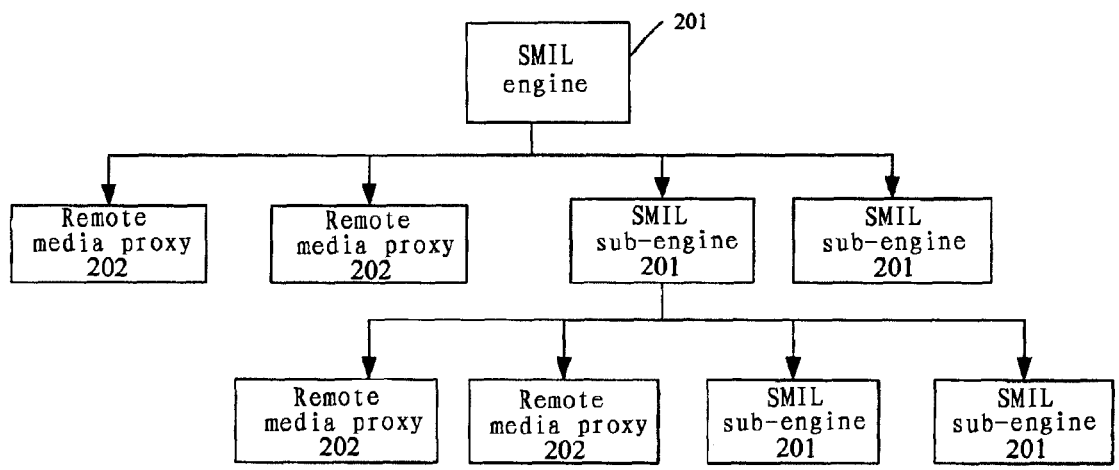
FIG. 1 is a schematic diagram of a system for playing SMIL based multimedia contents according to an embodiment of the present invention.

FIG. 1 is a schematic diagram of a system for playing SMIL based multimedia contents according to an embodiment of the present invention. In practice, the SMIL based contents are usually described by SMIL documents. As shown in FIG. 1, the system comprises a plurality of SMiL engines 201 and a plurality of remote media proxies 202, constructing a hierarchical structure, that is, a tree-link structure, of which the root node is a SMIL engine (it may be called as a "SMIL root engine") 201, The SMIL engines 201 at each level are used to analyze and interpret SMIL documents or parts of a document, as well as communicate with and control the remote media proxies 202 and/or next level SMIL engines (called as "SMIL sub-engine") 201 and/or local media playing devices.

The remote media proxies 202 are mainly used for controlling those remote media playing devices without SMIL interpretation capability, receiving instructions from the upper level SMIL engine(s) 201, starting or stopping providing media objects to the remote media playing devices, sending back events, and providing basic user interaction capability. In the media object provided to a remote media playing device by a remote media proxy 202, the media contents playable by the remote media playing device are defined, which may comprise, for instance, the address of the media server from which the remote media playing device acquires media contents. If the remote media playing device can not access the media server, the media contents to be played are acquired from the media server by the remote media proxy 202 and provided to the remote media playing device for playing.

In the present specification, the media playing devices comprise local media playing devices and remote media playing devices, wherein the local media playing device is meant a media playing device directly controlled by a SMIL engine, whereas the remote media playing device is meant a media playing device controlled by a remote media proxy. The media playing devices may be PvC devices. A local media playing device further comprises a media playing controller and a media player. The media playing controller drives the media player according to the instructions from a SMIL engine, acquires media contents to be played, and then provides the media contents to the media player for playing.

After the SMIL root engine 201 has downloaded a SMIL document from a SMIL server, the SMIL document is analyzed and decomposed into smaller SMIL documents that may be in two forms, ether a media object or multimedia contents contained in a time container. And then, these smaller SMIL documents are distributed to remote media proxies 202 and SMIL sub-engines 201, and/or kept locally as needed. A SMIL sub-engine continues to analyze received SMIL sub-document and distribute even smaller SMIL documents to remote media proxies 202 and SMIL sub-engines 201, and/or keep them locally. The above process is repeated recursively till the last level SMIL sub-engines 201. In this way, the SMIL document is distributed to the related nodes of the system after decomposition. When the SMIL based multimedia contents are being played, each SMIL engine interprets the received SMIL document, invokes related devices based on time and events, such as timing event, Document Object Model (DOM) event, etc. Then, the media playing devices will, based on the definitions of media objects provided by the remote media proxies 202 and/or SMIL engines 201, acquire media contents from corresponding media servers for playing. If a media playing device cannot access a media server, the media contents may be acquired by the remote media proxy 202 and provided to the remote media playing device for playing.

Besides, a user may interacts in various forms with remote media proxies 202 or SMIL engines 201 through various media channels provided by different media playing devices (such as PvC devices), the events produced consequently may also control the playing of the media contents, thereby improving the flexibility of the playing of multimedia contents be more flexible.

From the above descriptions, it can be seen that a system that applies the present embodiment may play SMIL based multimedia contents on a set of PvC devices with limited resources, which can be dynamically configured on demand, thereby constructing a new multimedia terminal that meet different requirements and further implementing user interactions in various forms.

Figure 2:
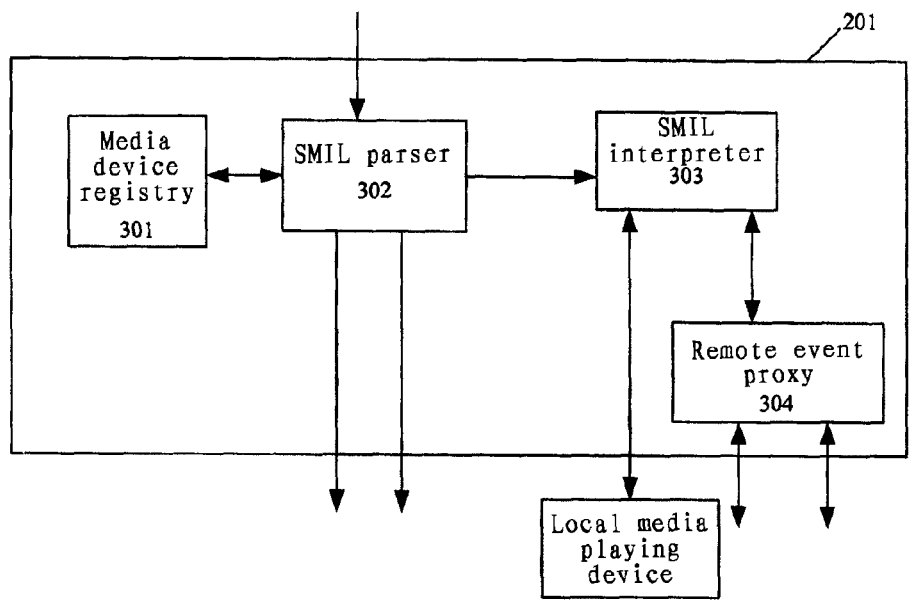
FIG. 2 is a schematic diagram of a SMIL engine according to an embodiment of the present invention.

FIG. 2 is a schematic diagram of an embodiment of the SMIL engines in FIG. 1. As shown in FIG. 2, the SMIL engine 201 comprises a media device registry 301, a SMIL parser 302, a SMIL interpreter 303 and a remote event proxy 304. Each above-mentioned module will be described in detail as followed.

The media device registry 301 is used for registering media devices controlled by the SMIL engine 201, comprising: local media playing devices that may locally play media contents defined by the SMIL document; remote media proxies that, according to the instructions from the SMIL engine 201, control the remote media playing devices to play media contents defined by SMIL media objects; next level SMIL engines that interpret parts of the SMIL document according to the control. All of above-mentioned three kinds of media devices support a subset of the media interaction capabilities defined by SMIL. When the system starts up, the interaction capabilities and location information of such media devices may be registered into the media device registry 301 manually or automatically.

When it is requested to play a SMIL document, the SMIL parser 302 downloads corresponding SMIL document from the SMIL server, analyzes the SMIL document, understands the contents of the SMIL document, and then searches for media devices with proper media interaction capabilities in the media device registry 301. According to the information on the media devices, intermediate SMIL models and/or internal SMIL models are generated, comprising static information of the SMIL objects. The intermediate SMIL model and internal SMIL model may be in two forms: media object and time container that contains multimedia contents, the difference between which is that an intermediate SMIL model is a text or serialized model that can be transferred between different nodes on a network, while an internal SMIL model is an executable object model that can be executed on the SMIL interpreter. According to predefined binding rules and the information provided by the media device registry 301, the media objects in the intermediate SMIL model are distributed to the remote media proxies 202 and/or local media playing devices, while the time containers in the intermediate SMIL model are distributed to the SMIL sub-engines 201. The internal SMIL model is deployed on the SMIL interpreter 303 that will be illustrated as below, and further controls lower level SMIL sub-engines, media proxies, and local media playing devices. The binding rules define the relationship between the intermediate SMIL model and/or internal SMIL model at the SMIL engine and the media devices controlled by the SMIL engine, which may be default or predefined. Once a time container is distributed to the SMIL engine 201, a local proxy object of the time container is generated and transferred to the SMIL interpreter 303; once a media object is distributed to a remote media proxy 202, a local proxy object of the media object is generated and also transferred to the SMIL interpreter 303. The SMIL parser 302 exchanges events with the sub SMIL engine 201 and the remote media proxy 202 to which the time container and media object is distributed, through a remote event proxy 304 that will be illustrated as below.

The SMIL interpreter 303 mainly interprets the playing logic of SMIL document, triggers the playing of media contents according to time and events, invokes corresponding remote media proxies 202 and/or SMIL sub-engines 201 and/or local media playing devices, and controls interaction with the user.

A mapping table, which is maintained in the remote event proxy 304, contains the relationship between the proxy objects in the local SMIL interpreter 303 and the media objects distributed to the remote media proxies 202 and time containers distributed to the SMIL sub-engines 201. The remote event proxy 304 is responsible for transferring serialized events, comprising SMIL timing events, DOM events etc., through which the playing of media contents may be controlled, between the local SMIL engines 201 and the SMIL sub-engines 201, remote media proxies 202.

From the above description, it can be seen that the SMIL engine applying the present embodiment can analyze and interpret SMIL based multimedia contents, and distribute the generated media objects and time containers to the local media playing devices, remote media proxies and SMIL sub-engines. Through the recursive analysis of each SMIL engine, the SMIL based multimedia contents are distributed to the nodes of the system. And, when being played, with each SMIL engine's recursive interpretation of the media objects and time containers, the media contents are played on the media playing devices.

Figure 3:
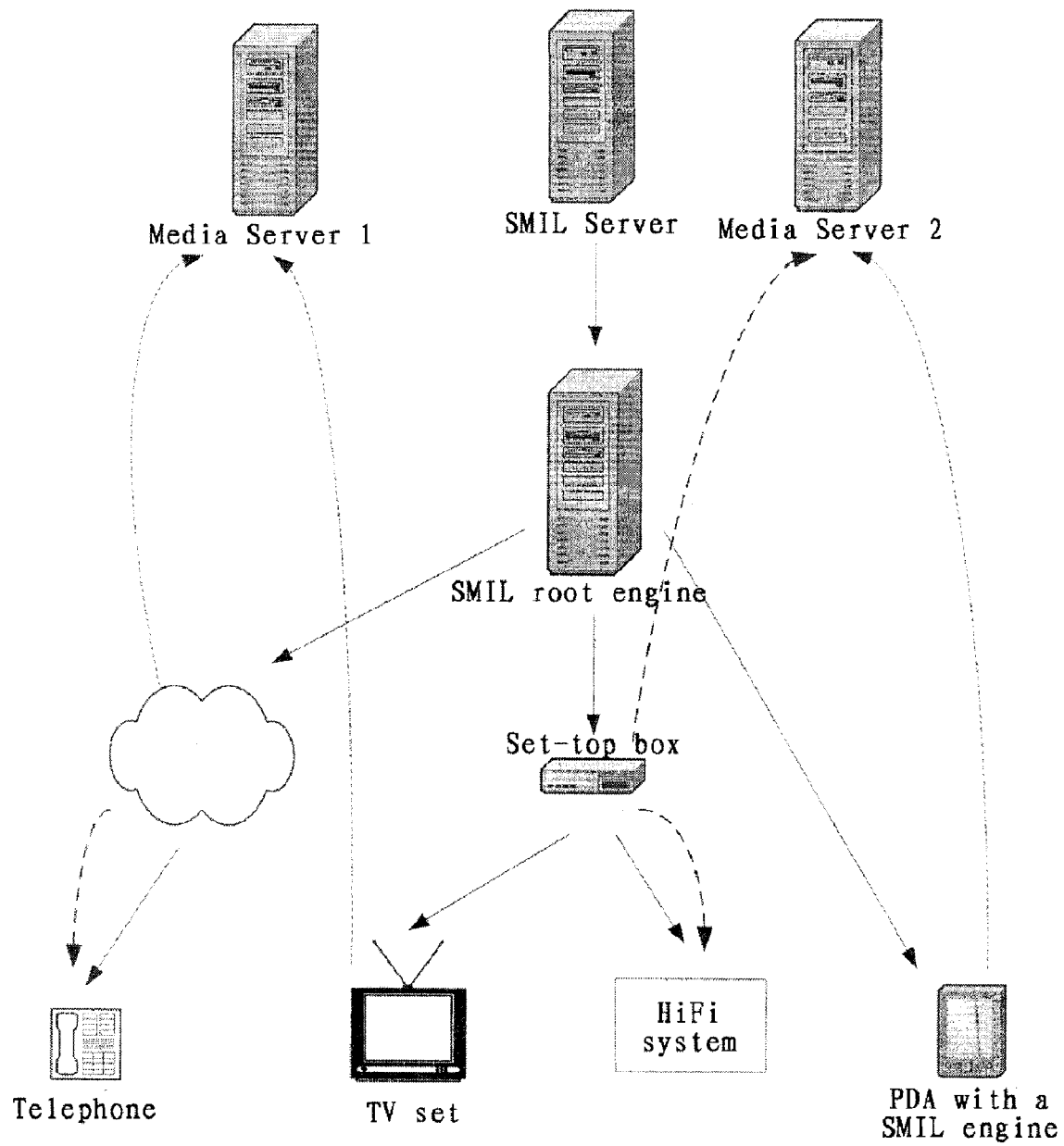
FIG. 3 is a schematic diagram of a typical application of the system shown in FIG. 1.

FIG. 3 is a schematic diagram of a typical application of the system of the present invention, which combines a telephone, a TV set, a HiFi system and a FDA for playing SMIL based multimedia contents, herein the telephone, TV set, HiFi system and PDA are all resource limited PvC devices. The system shown in FIG. 3 is a two-level distributed structure, wherein the first level is a SMIL root engine, and the second level comprises a PDA with a SMIL engine (that is, a SMIL engine that controls a local playing device—FDA), a set-top box attached to the TV set and the HiFi system (that is, a remote media proxy), and a telephone (a local media playing device of the SMIL root engine). The SMIL document is stored on the SMIL server. The locations and the supported media interaction capabilities of the telephone, TV set, HiFi system, FDA and set-top box are registered in the SMIL root engine. The media servers are used to store various media contents.

The SMIL document is downloaded to the SMIL root engine as requested. After the SMIL root engine analyzes the SMIL document, based on the binding rules and information of registered media devices, stream media objects for video and audio are distributed to the set-top box; time containers that contain text interaction and text stream are distributed to the PDA with a SMIL engine; and media objects for speech interaction are distributed to the telephone through the local SMIL interpreter. Then the PDA with a SMIL engine further analyzes the time containers and distributes the media objects for text stream to the local media device (FDA) through a local SMIL interpreter for executing. In this way, the SMIL document requested to be played is decomposed to various nodes of the system.

Then, the SMIL root engine starts up a main timer, invokes related devices according to time and events, and triggers the playing of SMIL based multimedia contents. If it is needed to play media contents of audio and video, related events are sent to the set-top box to trigger the playing. Due to the fact that the HiFi system cannot access the media server 2, the set-top box acquires media contents to be played from the media server 2 based on the definition of the audio media object, and then provides such media contents to the HiFi system for playing (as shown by the dashed lines), and for the TV set, after the set-top box provides corresponding video media object, the TV set acquires the media contents to be played from the corresponding media server 1 (as shown by the dashed line). If there is a need for text interaction and playing of media contents of a text stream, related events are sent to the PDA with a SMIL engine, which interprets the time container, acquires text stream from the corresponding media server 2 for playing based on the definitions of the text stream media object, and generates corresponding text interaction events. If there is a need for speech interaction, the SMIL root engine invokes the telephone to play, and the telephone acquires media contents to be played from the corresponding media server 1 through the telephone network, based on the definitions of the speech media object, and generates corresponding speech interaction events. It is certain that the events generated by the interaction between the user and the remote media proxy or SMIL engine may also start or stop playing media contents. When the main timer expires, the playing of media contents is finished.

Figure 4:
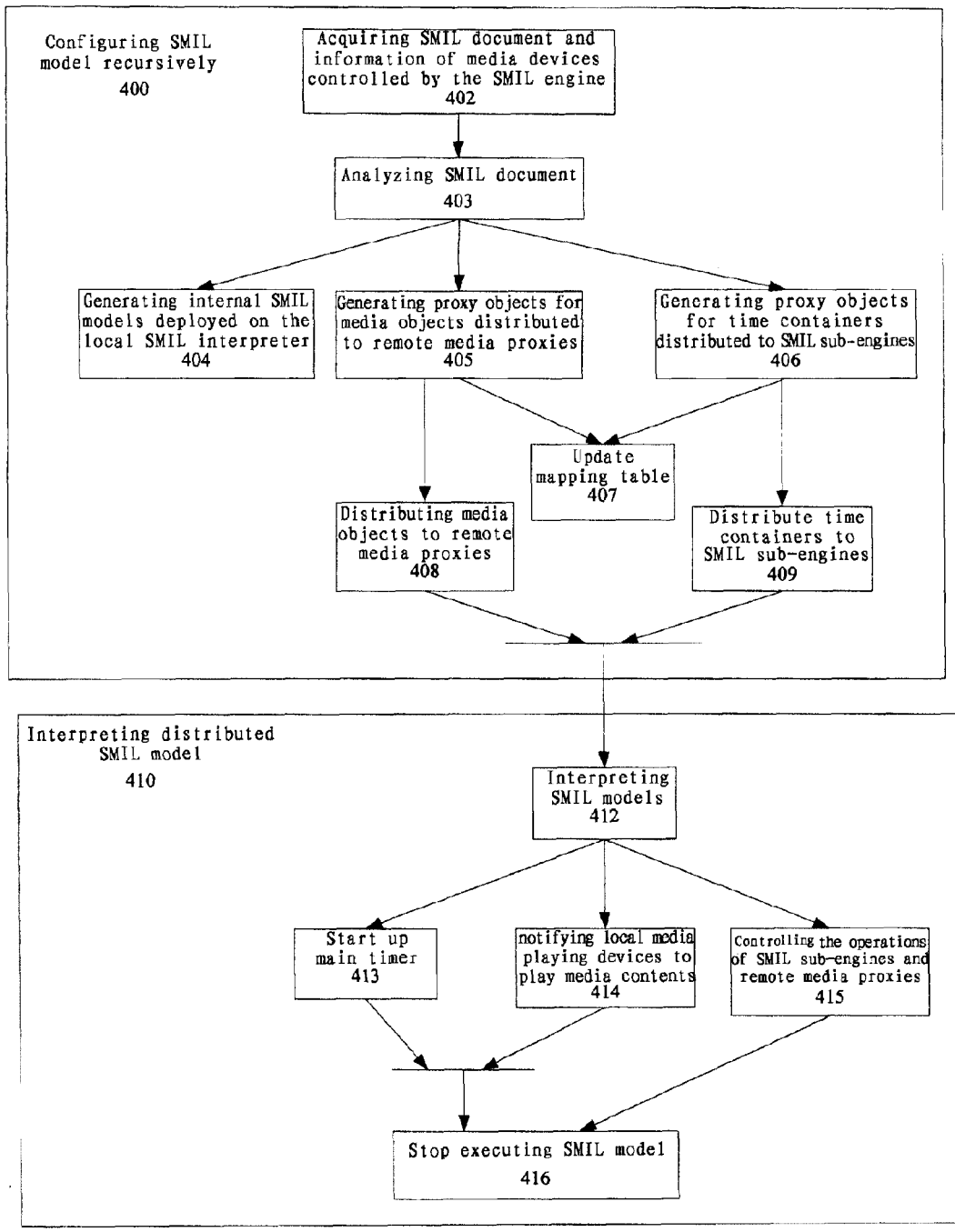
FIG. 4 is a schematic flowchart of a method for playing SMIL based multimedia contents according to an embodiment of the present invention.

FIG. 4 is a schematic flowchart of a method for playing SMIL based multimedia contents according to an embodiment of the present invention. The method may comprise two main steps: Step 400 for recursive configuration of SMIL models at respective nodes and Step 410 for the interpretation of the distributed SMIL model Before a SMIL document is played, it is needed for each SMIL engine to establish a mapping table, which is used for registering the media information, interaction capabilities and location information of the media devices, such as local media playing devices, remote media proxies, and SMIL sub engines, controlled by the SMIL engine.

At Step 400, when a user invokes a presentation of SMIL based multimedia contents through any interaction channel, first at Step 402, a SMIL parser in the SMIL engine acquires and analyzes a SMIL document, searches for the capability table stored in the media device registry of the SMIL engine, and acquires information of the controlled media devices. Then, at Step 403, the SMIL engine, based on the above information, generates internal SMIL models deployed on the local SMIL interpreter and intermediate SMIL models distributed to the remote media proxies and SMIL sub-engines (Steps 404 to 406). Usually, a media object is bound to a local media playing device or a remote media proxy, while a time container is bound to a SMIL sub-engine. For a media object distributed to a remote media proxy and a time container distributed to a SMIL sub-engine, corresponding local proxy object is generated. Then, at Step 407, the mapping table stored in the remote event proxy of the SMIL engine is updated, which records the relationships between the local proxy objects and the media objects and time containers distributed to the remote media proxies and SMIL sub-engines. At Steps 408 and 409, the SMIL parser distributes the media objects to the remote media proxies and distributes the time containers to the SMIL sub-engines. The SMIL sub-engine proceeds with the above process and finally the SMIL document is recursively configured to various nodes After the SMIL document is successfully configured to the whole system, Step 410 begins to execute for interpreting the distributed SMIL model. First, at Step 412, the SMIL interpreter of each SMIL engine interprets respective intermediate SMIL model and local SMIL model. In the present embodiment, a main timer is set in the SMIL root engine for timing the playing of the SMIL document. It is certain that a user interaction approach may also be used to start and stop playing media contents through events. At Step 413, the SMIL root engine starts up the main timer for timing. Each SMIL engine, after the interpretation of respective SMIL models, may inform the local media playing devices to play the media contents according to timing or interactive events (Step 414), so that the local media playing devices, after acquiring the media contents to be played, play the media contents based on the definitions of the media object; and send events to the remote devices through remote event proxies to invoke various related devices, such as SMIL sub-engines or remote media proxies, at Step 415, to control the operations of the SMIL sub-engines and remote media proxies so that the remote media playing devices play corresponding media contents. When a remote media proxy's operation is invoked to play media contents, the remote media proxy determines whether it is needed to acquire media contents to be played based on the capabilities of the controlled remote media playing devices; if so, the media contents, after being acquired, are provided to the remote media playing devices for playing; if not, corresponding media objects are provided to the remote media playing devices, which acquire and play the media contents to be played based on the definitions of the media object. At Step 416, when the main timer expires, the playing of media contents is finished and the execution of the SMIL model is terminated.

From the above description, it can be understood that by using the method of the present embodiment, it is possible to implement the playing of SMIL based multimedia contents on a set of PvC devices with limited resources, which can be dynamically configured as a new multimedia terminal.

Although the system, method and engine for playing SMIL based multimedia contents of the present invention have been described in detail through some exemplary embodiments, the above-mentioned embodiments are not exhaustive. Those skilled in the art may implement various changes and modifications within the spirit and scope of the present invention. Therefore, the present invention is not limited to these embodiments; the scope of the invention should only be defined by the appended claims herein.

The invention claimed is:

1. A system for playing SMIL based multimedia content, wherein said system comprises:

a plurality of SMIL engines constructed in a hierarchical structure comprising a root SMIL engine and a set of child SMIL engines, each having the root SMIL engine as a parent, wherein each of the SMIL engines executes within a separate computing device, wherein each of the plurality SMIL engines are able to analyze and interpret SMIL documents or parts of a SMIL document, wherein said root engine is configured to analyze and decompose a SMIL document into a plurality of sub SMIL documents having an aggregate functionality of the SMIL document, wherein each of the sub SMIL documents are distributed among the set of child SMIL engines, wherein each of the child SMIL engines is configured to interpret the received sub SMIL documents and manage timing and events as specified within the sub SMIL documents, wherein each of the child SMIL engines directly controls a media playing device, wherein a plurality of media playing devices controlled by the child SMIL engines aggregately interact in accordance with the SMIL document that was analyzed and decomposed by the root SMIL engine, wherein the root SMIL engine comprises:

a media device registry for registering one or more media devices controlled by said root SMIL engine;

a SMIL parser for, based on the analysis of the SMIL document and acquired information on media interaction capabilities of the controlled media devices, generating a set of SMIL models, distributing the set of SMIL models to different ones of the child SMIL engines;

a SMIL interpreter for interpreting and executing the playing logic of the SMIL document, triggering child SMIL engines to play the media contents and controlling interaction with a user; and a remote event proxy for maintaining a mapping table that contains the relationships for the SMIL models distributed to the child SMIL engines.

2. The system according to claim 1, wherein the media devices controlled by said root SMIL engine comprises: child SMIL engines, which support a subset of SMIL defined media interaction capabilities and register respective media interaction capabilities and location information in said media device registry when the system starts up.

3. The system according to claim 1, wherein at least a portion of the SMIL models comprises a time container that contains multimedia contents distributed to one of the child SMIL engines and a media object distributed to a remote media proxy; and said SMIL model is a time container executable on a SMIL interpreter of one of the child SMIL engines.

4. The system according to claim 1, wherein each media playing device controlled by a child SMIL engine comprises:

a media playing controller for driving a media player according to the triggering mechanism of said controlling child SMIL engine, and acquiring media contents to be played; and a media player for playing media contents.

5. The system according to claim 1, wherein said remote proxy is responsive for timing events, document object model events, user interaction events, and internal events related to the SMIL document.

6. The system according to claim 1, wherein each media playing devices is a pervasive computing device.

7. The system of claim 1, wherein each of the sub SMIL documents are able to be handled using fewer computing resource than an amount of computing resource that would be required to handle the SMIL document.

8. The system of claim 1, wherein an SMIL interpreter of each child SMIL engine is configured to interpret playing logic of the sub SMIL document, to invoke playing of media content to one of the media playing devices that the child SMIL engine controls, and to control interactions with a user of the media playing device that the child SMIL engine controls.

9. The system of claim 1, further comprising:

a mapping table, which contains the timing relationships between the sub SMIL documents in accordance with the SMIL document, which is used to maintain timing relationships among the child SMIL engines in accordance with the SMIL document.

10. A system for playing SMIL based multimedia contents, comprising:

a plurality of SMIL engines for analyzing and interpreting SMIL documents, as well as communicating with and controlling next level SMIL engines, remote media proxies, or local media playing devices;

a plurality of remote media proxies for receiving instructions from upper level SMIL engines, starting or stopping providing media objects to the remote media playing devices, sending back events, and providing basic user interaction capabilities, wherein said a plurality of SMIL engines, a plurality of remote media proxies, and local and remote media playing devices construct a tree-link structure, of which the root node is a SMIL engine, the branch nodes are SMIL engines and remote media proxies, and the leaf nodes are local media playing devices and remote media playing devices, wherein each of said remote media proxies determines which media objects to be provided according to the capabilities of the remote media playing devices: if a remote media playing device cannot access any media server, the provided media object contains media contents to be played; and if the remote playing device can access a media server, the provided media object contains the address of the media server for acquiring media contents.

11. The system according to claim 10, wherein said local media playing devices and remote media playing devices are pervasive computing devices.

12. A method for playing SMIL based multimedia content comprising the following steps:

analyzing, with a SMIL engine, a SMIL document and acquiring information on the media interaction capabilities of the media devices controlled by said SMIL engine;

based on the acquired information on the media interaction capabilities, with said SMIL engine, generating intermediate SMIL models, distributing the intermediate SMIL models to next level SMIL engines and/or remote media proxies and generating corresponding local proxy objects; and/or generating internal SMIL models to be deployed on a local SMIL interpreter;

updating a mapping table, which records the relationships between said local proxy objects and the intermediate SMIL models distributed to the next level SMIL engine and the remote media proxies;

proceeding with above-mentioned steps recursively till the last level SMIL engines with the next level SMIL engines;

interpreting respectively the received intermediate SMIL models and generating internal SMIL models with each said SMIL engine; and starting up the remote media playing devices and/or local media playing devices to play media contents according to time and events, wherein said starting up remote media playing devices to play media contents comprises: the remote media proxies determine whether it is needed to acquire media contents to be played according to the capabilities of the controlled remote media playing devices; if so, the media contents to be played are acquired by the remote media proxies and provided to the remote media playing devices for playing; if not, corresponding media links or descriptors are provided to the remote media playing devices, which acquire and play media contents to be played.

13. The method according to claim 12, wherein the media devices controlled by said SMIL engine comprises: next level SMIL engines, remote media proxies, and local media playing devices, all of which support a subset of SMIL defined media interaction capabilities.

14. The method according to claim 12, wherein said intermediate SMIL model comprises a time container that contains multimedia contents distributed to a next level SMIL engine, and a media object distributed to a remote media proxy; said internal SMIL model is a time container executable locally, comprising the control logic of the present level SMIL model and the media object distributed to a local media playing device.

15. The method according to claim 12, wherein said events comprise: timing events, document object model events, user interaction events, and internal events.

16. The method according to claim 12, wherein said step for starting up local media playing devices to play media contents comprises: the local media playing devices acquire media contents from corresponding media servers based on the definitions of the received media objects and play the media contents.

17. The method according to claim 12, wherein said local media playing devices and remote media playing devices are pervasive computing devices.

* * * * *